United States Patent [19]
Davis et al.

[11] Patent Number: 5,137,775
[45] Date of Patent: Aug. 11, 1992

[54] EMBOSSABLE LAMINATES

[75] Inventors: Robert F. Davis, Wilmington, Del.; Sina Ebnesajjad, East Amherst, N.Y.

[73] Assignee: E. I. du Pont de Nemours and Company, Wilmington, Del.

[21] Appl. No.: 707,773

[22] Filed: May 30, 1991

[51] Int. Cl.$^5$ .................. B32B 7/02; B32B 27/08; B31F 1/00
[52] U.S. Cl. ................... 428/216; 156/220; 428/421

[58] Field of Search ............... 428/421, 216; 427/220, 427/219

[56] References Cited

U.S. PATENT DOCUMENTS 4,937,135  6/1990  Bloom ...................... 428/421

Primary Examiner—Thomas J. Herbert, Jr.

[57] ABSTRACT

Thin laminates of polyarylether ketone ketone and polyvinyl fluoride can be embossed without destruction of the polyvinyl fluoride and, on combustion, result in low smoke levels.

6 Claims, 1 Drawing Sheet

FIGURE
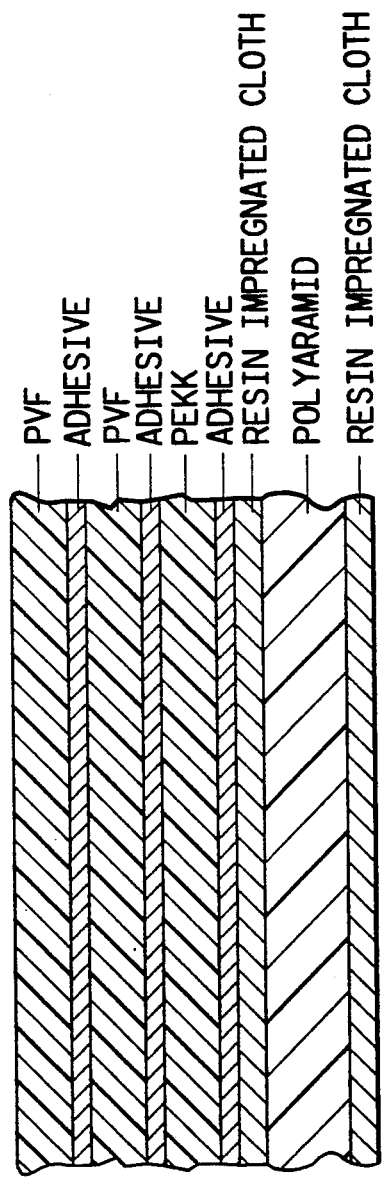

EMBOSSABLE LAMINATES

BACKGROUND OF THE INVENTION

Polyvinyl fluoride (PVF), commercially available in film form, is used in a wide variety of protective and decorative applications. Typically, PVF is laminated to another surface. For example, it is often used as the top surface on aluminum or polyvinyl chloride panels used for house siding.

PVF has also been used for surfacing interior aircraft panels, bonded to a substrate that forms the basic structural component of such panels. Bloom, in U.S. Pat. No. 4,937,135, describes thick laminates of PVF and polyaryletherketoneketone (PEKK), in which the thickness of the PEKK is greater than about 625 micrometers.

These Bloom laminates are thermoformable, under the conditions described therein However, decorative aircraft interior panels are often also required to be embossed. The laminates of Bloom could be so treated in two ways.

Specifically, these laminates could be embossed upon extrusion, before the relatively thick layer of PEKK had fully cooled. In the alternative, an embossing resin could be included between the PVF and the PEKK layers. The embossing resin is a material that flows under heat and pressure, and is usually present as a 3-5 mil sheet. This type of layer permits the embossing of the PVF without heating the PEKK to its melting or softening temperature, at which the PVF would be destroyed, since the melting temperature of PEKK (305° C.) is significantly higher than the decomposition temperature of PVF (200° C.). While these interlayers provided satisfactorily embossed articles, the embossing resins typically generate undesirably high smoke levels upon combustion or overheating. This would make the laminates unsatisfactory in most aircraft applications.

SUMMARY OF THE INVENTION

The present invention is based on the discovery that thin laminates of PVF and PEKK can be satisfactorily embossed without the inclusion of embossing resin.

Specifically, the instant invention provides an embossable laminate consisting essentially of, and bonded together in the order specified, (a) a layer of polymer having a thickness of about from 25 to 250 micrometers and consisting essentially of polyaryletherketoneketone having a crystallinity of less than about 5% and consisting essentially of repeating units of the formula:

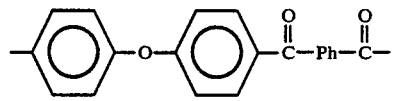

wherein Ph is either the 1,4-phenylene or the 1,3-phenylene group, the ratio of 1,4-phenylene groups to 1,3-phenylene groups being about from 70:30 to 100; and (b) at least one layer of polyvinyl fluoride film having a thickness of about from 12.5 to 200 micrometers.

The present invention further provides a process for embossing a laminar structure consisting essentially of, and bonded together in the order specified, (a) a layer of polymer having a thickness of about from 25 to 250 micrometers and consisting essentially of polyaryletherketoneketone having a crystallinity of less than about 5% and consisting essentially of repeating units of the formula:

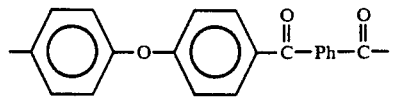

wherein Ph is either the 1,4-phenylene or the 1,3-phenylene group, the ratio of 1,4-phenylene groups to 1,3-phenylene groups being about from 70:30 to 0:100; and (b) at least one layer of polyvinyl fluoride film having a thickness of about from 12.5 to 200 micrometers; which process comprises contacting the laminate with an embossing surface at a pressure of about from 100 to 3000 KPa and a temperature of about from 150° to 200° C.

BRIEF DESCRIPTION OF THE DRAWING

The FIGURE is a cross-sectional representation of a laminar structure of the present invention.

DETAILED DESCRIPTION OF THE INVENTION

The PVF and PEKK used in the present invention are those fully described in Bloom, U.S. Pat. No. 4,937,135, which is hereby incorporated by reference.

The PVF layer in the present constructions can have a thickness in the same general range as in the Bloom patent, that is, about from 12.5 to 200 micrometers, and preferably about from 25 to 100 micrometers. At least one PVF layer is used in the present invention, and two or more are often preferred in decorative applications, as, for example, when a decorative design is printed on the surface of one PVF layer. In those cases, a clear protective layer of PVF is placed over the printed surface.

The PEKK layer, in the present laminates, can have a thickness of about from 25 to 250 micrometers, and preferably about from 75 to 150 micrometers. It has been found that PEKK layers in excess of 250 micrometers do not permit embossing without significant depreciation of the PVF layer.

The PVF and PEKK layers used in the present invention can each contain the additives described in the Bloom patent previously incorporated by reference. The general laminating techniques described in that patent can also be used.

While the present laminates are substantially free from embossing resins, adhesives can be used in the laminating process. A wide variety of such adhesives can be used, such as acrylics, polyesters, polyamides, epoxies, urethanes, silicones and rubbers. In general, the thickness of the adhesive layer should be no greater than about 12 micrometers, and is typically about from 2 to 7 micrometers.

In embossing the laminates of the present invention, the laminates are contacted with an embossing surface at a pressure of about from 100 to 3000 KPa and a temperature of about from 150° to 200° C.

The laminates of the present invention permit the preparation of embossed PVF surfaces without the inclusion of smoke-generating embossing resins. In general, the smoke-generation of the present laminates, as measured by the National Institute of Science and Technology (formerly the National Bureau of Standards) smoke test, as defined by ASTM E662-83, measuring the specific optical density after 4 minutes, is less than about 20, and often less than 15.

The present invention is further illustrated by the following Examples and Comparative Examples.

EXAMPLE 1

A laminate of PVF and PEKK was prepared and bonded to a substrate of the type typically used in the construction of aircraft interior panels.

The laminate components and the substrate were assembled in the desired order.

The top layer was a transparent PVF film having a thickness of 25 micrometers (1 mils), and commercially available from the Du Pont Company as Tedlar TR10BG3 polyvinylfluoride film. This layer was coated with substantially pure polymethylmethacrylate adhesive in a thickness which varied from 2 to 5 micrometers (0.0001-0.0002 inch). The adhesive was applied with a doctor bar and allowed to dry before assembling the laminate.

The next layer was another layer of PVF, bearing a decorative ink on the surface, and commercially available from the Du Pont Company as Tedlar CW20BE3 polyvinyl film. This PVF layer was similarly coated with polymethylmethacrylate adhesive.

The next layer was a PEKK, consisting of polymer prepared substantially according to the procedures described in U.S. Pat. No. 4,996,287, and formed into a film having a thickness of 37.5 micrometers.

The PVF and PEKK layers were placed over an isocyanate based adhesive commercially available as Bostic 7132, at a thickness of 2 micrometers, and crushed core having a thickness of 3,125 micrometers. The crushed core was a composite commercially available from the Hexcel division of Ciba-Geigy as Nomex ® core. The core consists of a honeycomb structure of Nomex ® polyaramid paper. The honeycomb structure is laminated on both sides with a fiberglass cloth impregnated with a crosslinkable phenolic resin.

The components were stacked between two aluminum plates. A release sheet was placed between the plates and the laminate components. A texturing plate was placed directly on top of the laminate assembly, between the release sheet and the top PVF film. The texturing plate was a cured epoxy preimpregnated woven fiberglass fabric with a coating of FEP fluoropolymer film bonded to its surface to aid release.

The assembly was placed in a heated press for 15 minutes at a temperature of 177° C. and a pressure of 100 psi.

The panel was cooled to room temperature prior to removal of the pressure. It was tested according to the NBS smoke and Ohio State University heat release tests, and the results are reported in the Table. The Ohio State University heat release test is fully described in Federal Aviation Administration publication number DOT/FAA/CT-89/15, published September 1989, and corresponding to ASTM E-906.

CONTROL EXAMPLE A

The procedure of Example 1 was repeated, except a low heat release embossing resin, described in U.S. Pat. No. 4,788,091, was placed between the PVF and the PEKK. The resulting laminate was tested as before, and the results are reported in the Table.

CONTROL EXAMPLE B

The procedure of Example 1 was repeated, except the PEKK layer had a thickness of 137.5 micrometers (5.5 mil). Both sides of the PEKK layer were treated with corona discharge to enhance adhesion. The resulting was tested as before and the results are reported in the Table.

We claim:

1. An embossable laminar structure consisting essentially of, and bonded together in the order specified,
   (a) a layer of polymer having a thickness of about from 25 to 250 micrometers and consisting essentially of polyaryletherketoneketone having a crystallinity of less than about 5% and consisting essentially of repeating units of the formula:

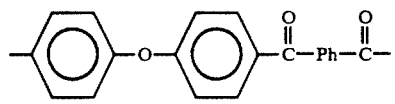

wherein Ph is either the 1,4-phenylene, the 1,3-phenylene group or mixtures thereof, the ratio of 1,4-phenylene groups to 1,3-phenylene groups being about from 70:30 to 0:100;
   (b) at least one layer of polyvinyl fluoride film having a thickness of about from 12.5 to 200 micrometers.

2. A laminar structure of claim 1 wherein the polyaryletherketoneketone has a thickness of about from 75 to 150 micrometers.

3. A laminar structure of claim 1 wherein the polyvinylfluoride film has a thickness of about from 25 to 100 micrometers.

4. A laminar structure of claim 1 comprising at least 2 polyvinylfluoride films.

5. A laminar structure of claim 1 wherein components (a) and (b) are adhesively bonded together.

6. A process for embossing a laminar structure consisting essentially of, and bonded together in the order specified,
   (a) a layer of polymer having a thickness of about from 25 to 250 micrometers and consisting essentially of polyaryletherketoneketone having a crystallinity of less than about 5% and consisting essentially of repeating units of the formula:

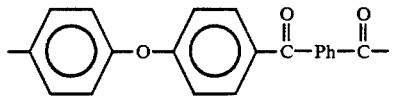

wherein Ph is either the 1,4-phenylene or the 1,3-phenylene group, the ratio of 1,4-phenylene groups to 1,3-phenylene groups being about from 70:30 to 0:100;
   (b) at least one layer of polyvinyl fluoride film having a thickness of about from 12.5 to 200 micrometers;
   which process comprises contacting the laminate with an embossing surface at a pressure of about from 100 to 3000 KPa and a temperature of about from 150° to 200° C.

* * * * *